United States Patent
Hsu et al.

(10) Patent No.: US 12,372,728 B2
(45) Date of Patent: Jul. 29, 2025

(54) OPTICAL FIBER CONNECTOR WITH ATTENUATION FUNCTION

(71) Applicants: Gloriole Electroptic Technology Corp., Kaohsiung (TW); SHEN ZHEN WONDERWIN TECHNOLOGY CO., LTD., Shenzhen (CN)

(72) Inventors: Hsien-Hsin Hsu, Kaohsiung (TW); Yu Cheng Chen, Kaohsiung (TW); Ke Xue Ning, Shenzhen (CN); Shu Bin Li, Shenzhen (CN)

(73) Assignees: GLORIOLE ELECTROPTIC TECHNOLOGY CORP., Kaohsiung (TW); SHEN ZHEN WONDERWIN TECHNOLOGY CO., LTD., Shenzhen (CN)

( * ) Notice: Subject to any disclaimer, the term of this patent is extended or adjusted under 35 U.S.C. 154(b) by 336 days.

(21) Appl. No.: 18/156,681

(22) Filed: Jan. 19, 2023

(65) Prior Publication Data

US 2024/0126023 A1 Apr. 18, 2024

(30) Foreign Application Priority Data

Oct. 12, 2022 (TW) .................................. 111211118

(51) Int. Cl.
*G02B 6/38* (2006.01)
*G02B 6/40* (2006.01)
(52) U.S. Cl.
CPC ......... *G02B 6/3845* (2013.01); *G02B 6/3825* (2013.01); *G02B 6/3831* (2013.01); *G02B 6/387* (2013.01); *G02B 6/406* (2013.01)

(58) Field of Classification Search
CPC .. G02B 6/3825; G02B 6/3831; G02B 6/3845; G02B 6/387; G02B 6/406
See application file for complete search history.

(56) References Cited

U.S. PATENT DOCUMENTS 10,281,669 B2 * 5/2019 Takano .................. G02B 6/387
11,187,857 B2 * 11/2021 Chang .................. G02B 6/3879
(Continued)

FOREIGN PATENT DOCUMENTS

WO WO-2020160254 A1 * 8/2020 ........... G02B 6/3825

*Primary Examiner* — Ryan A Lepisto
(74) *Attorney, Agent, or Firm* — MUNCY, GEISSLER, OLDS & LOWE, P.C.

(57) ABSTRACT

An optical fiber connector includes a connecting unit, an adapter unit, and an attenuation unit. The adapter unit includes an insertion seat connected removably to a main housing of the connecting unit, and two guide frame bodies located respectively at two opposite sides of the insertion seat in a transverse direction. The insertion seat has two insertion holes spaced apart in the transverse direction and extending in a front-rear direction. Each guide frame body extends in the front-rear direction away from the connecting unit. The attenuation unit includes two attenuation components, two rear ferrules, and two front ferrules. The attenuation components are arranged in the transverse direction and disposed within the main housing. The rear ferrules respectively extend rearwardly from rear ends of the attenuation components into the insertion holes. The front ferrules respectively extend forwardly from front ends of the attenuation components through and outwardly of the main housing.

9 Claims, 7 Drawing Sheets

(56) References Cited

U.S. PATENT DOCUMENTS

| | | | |
|---|---|---|---|
| 11,340,406 B2* | 5/2022 | Gniadek | G02B 6/3825 |
| 11,583,989 B2* | 2/2023 | Pugalumperumal | B25B 23/0035 |
| 11,940,654 B2* | 3/2024 | Higley | G02B 6/3825 |
| 12,013,576 B2* | 6/2024 | Hsu | G02B 6/3831 |
| 2019/0064447 A1* | 2/2019 | Chang | G02B 6/4292 |
| 2021/0263238 A1* | 8/2021 | Tseng | G02B 6/3869 |

* cited by examiner

OPTICAL FIBER CONNECTOR WITH ATTENUATION FUNCTION

CROSS-REFERENCE TO RELATED APPLICATION

This application claims priority of Taiwanese Utility Model Patent Application No. 111211118, filed on Oct. 12, 2022.

FIELD

This disclosure relates to a connector, and more particularly to an optical fiber connector with attenuation function.

BACKGROUND

An optical fiber attenuator is a component connected between two single core fiber lines, of which the main function is to reduce the power of the optical signal transmitted by the optical fiber lines to avoid optical saturation, and which also prevents the back-end equipment from receiving an excessively powerful optical signal and being damaged. However, the optical fiber attenuators currently on the market are connected in an external manner, if used in conjunction with other optical fiber connectors and optical fiber adapters, the number of required components is increased, and space is inevitably occupied. Furthermore, the design of the conventional optical fiber connector is that each optical fiber attenuator corresponds to a single core optical fiber line, thus the conventional optical fiber connector cannot be applied to the specification of one optical fiber connection to two ferrules, which would not fit into many currently newer optical fiber connection specifications.

SUMMARY

Therefore, an object of the disclosure is to provide an optical fiber connector with attenuating function that can alleviate the drawback of the prior art.

According to the disclosure, the optical fiber connector includes a connecting unit, an adapter unit, and an attenuation unit. The connecting unit includes a main housing and a connecting member that is disposed on the main housing. The main housing and the connecting member are arranged in a transverse direction. The adapter unit includes an insertion seat that is connected removably to the main housing, and two guide frame bodies that are located respectively at two opposite sides of the insertion seat in the transverse direction. The insertion seat has two insertion holes that are spaced apart from each other in the transverse direction and that extend in a front-rear direction perpendicular to the transverse direction. Each of the guide frame bodies extends in the front-rear direction away from the connecting unit and has a guide groove that extends in the front-rear direction. The guide grooves of the guide frame bodies face each other. The attenuation unit includes two attenuation components, two rear ferrules, and two front ferrules. The attenuation components are arranged in the transverse direction and are disposed within the main housing. The rear ferrules are respectively connected to rear ends of the attenuation components, and respectively extend rearwardly into the insertion holes. The front ferrules are respectively connected to front ends of the attenuation components, and respectively extend forwardly through and outwardly of the main housing.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Figure 1:
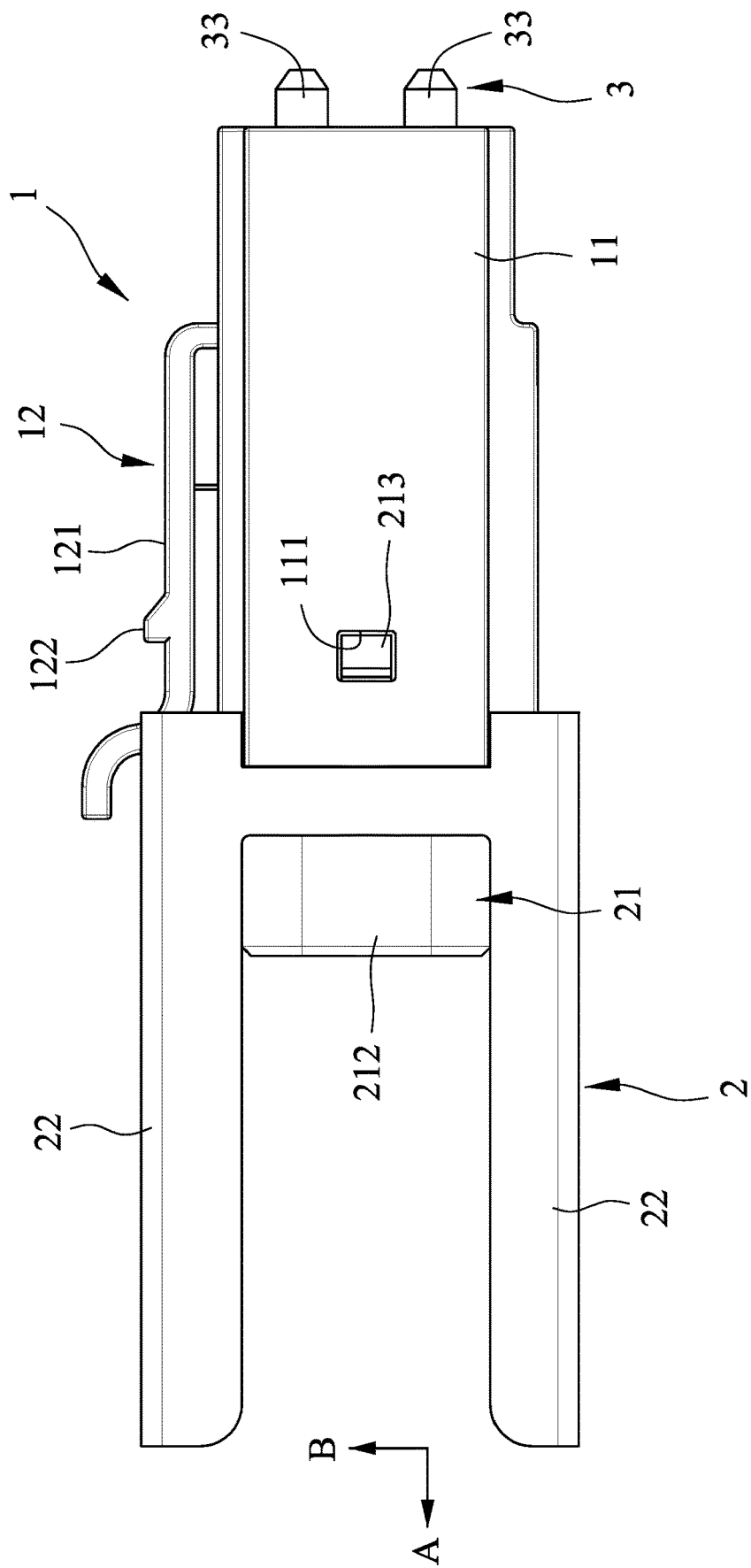
FIG. 1 is a side view illustrating a first embodiment of an optical fiber connector with an attenuation function according to the present disclosure.

Before the disclosure is described in greater detail, it should be noted that, where considered appropriate, reference numerals have been repeated among the figures to indicate corresponding or analogous elements, which may optionally have similar characteristics.

Figure 2:
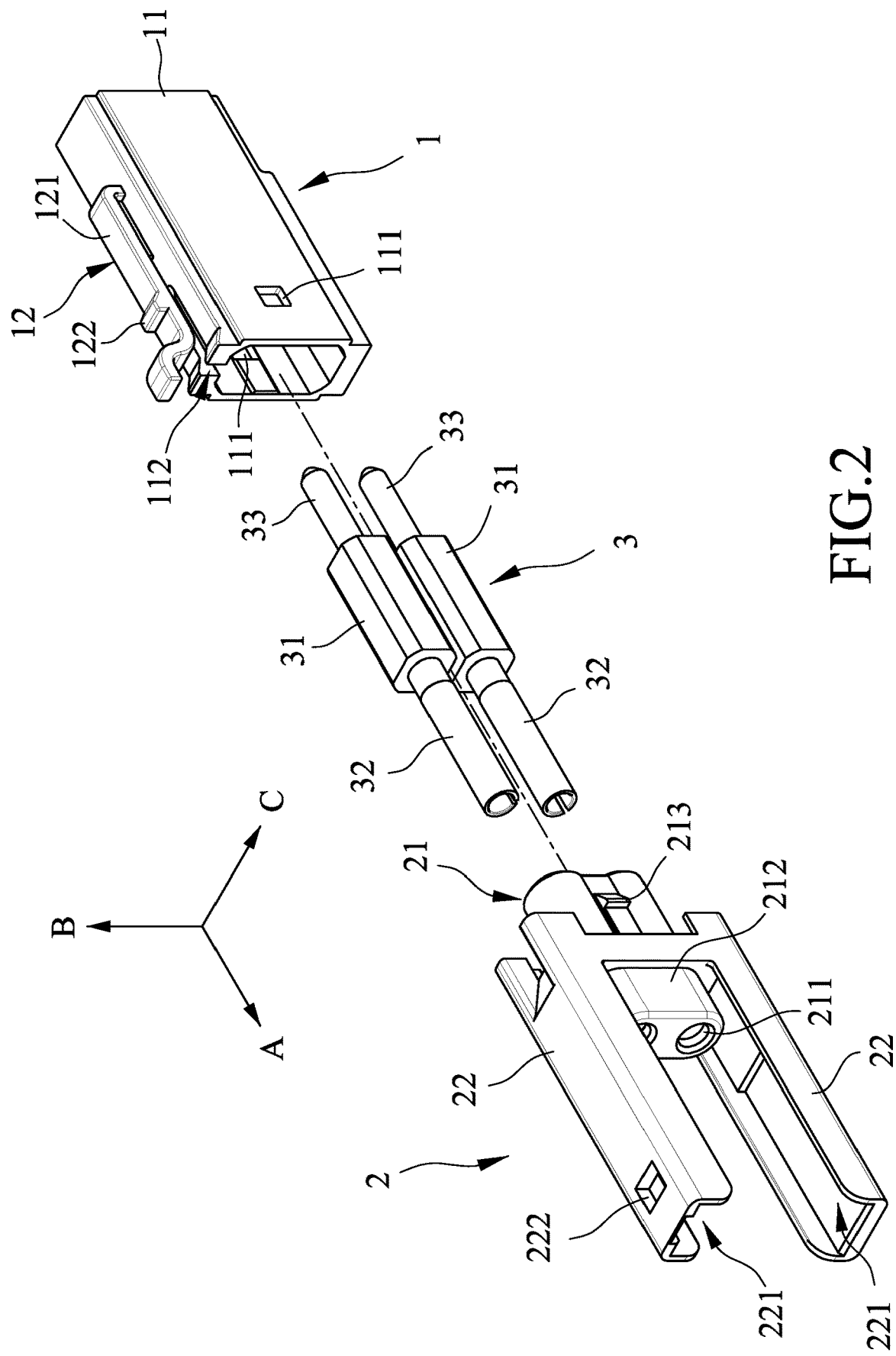
FIG. 2 is an exploded perspective view illustrating relative relationships between various parts of the first embodiment.
Figure 3:
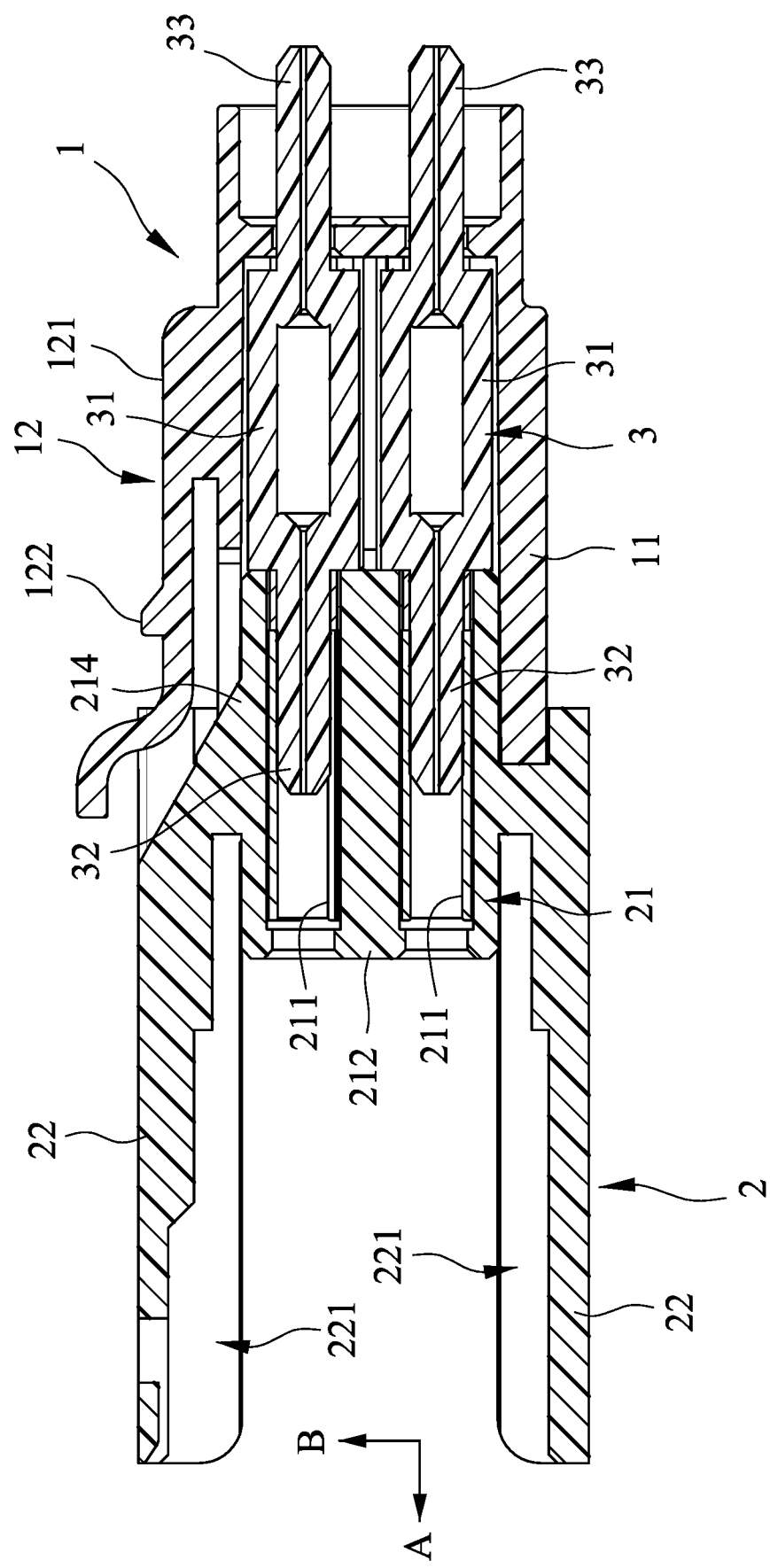
FIG. 3 is a sectional view of the first embodiment.

Referring to FIGS. 1, 2, and 3, a first embodiment of an optical fiber connector with attenuation function according to the present disclosure includes a connecting unit 1, an adapter unit 2 disposed behind the connecting unit 1 in a front-rear direction (A), and an attenuation unit 3 disposed within the connecting unit 1 and the adapter unit 2. The connecting unit 1 includes a main housing 11, and a connecting member 12 disposed on the main housing 11. The main housing 11 and the connecting member 12 are arranged in a transverse direction (B) perpendicular to the front-rear direction (A). The main housing 11 has two engaging open grooves 111 that are formed respectively in two opposite sides of the main housing 11 in a lateral direction (C) perpendicular to the transverse direction (B) and the front-rear direction (A), and a positioning groove 112 that extends in the front-rear direction (A) and that opens toward the adapter unit 2. The connecting member 12 has an extension portion 121 connected to the main housing 11 and extending in the front-rear direction (A) toward the adapter unit 2, and an engaging portion 122 protruding from the extension portion 121 in the transverse direction (B).

Figure 4:
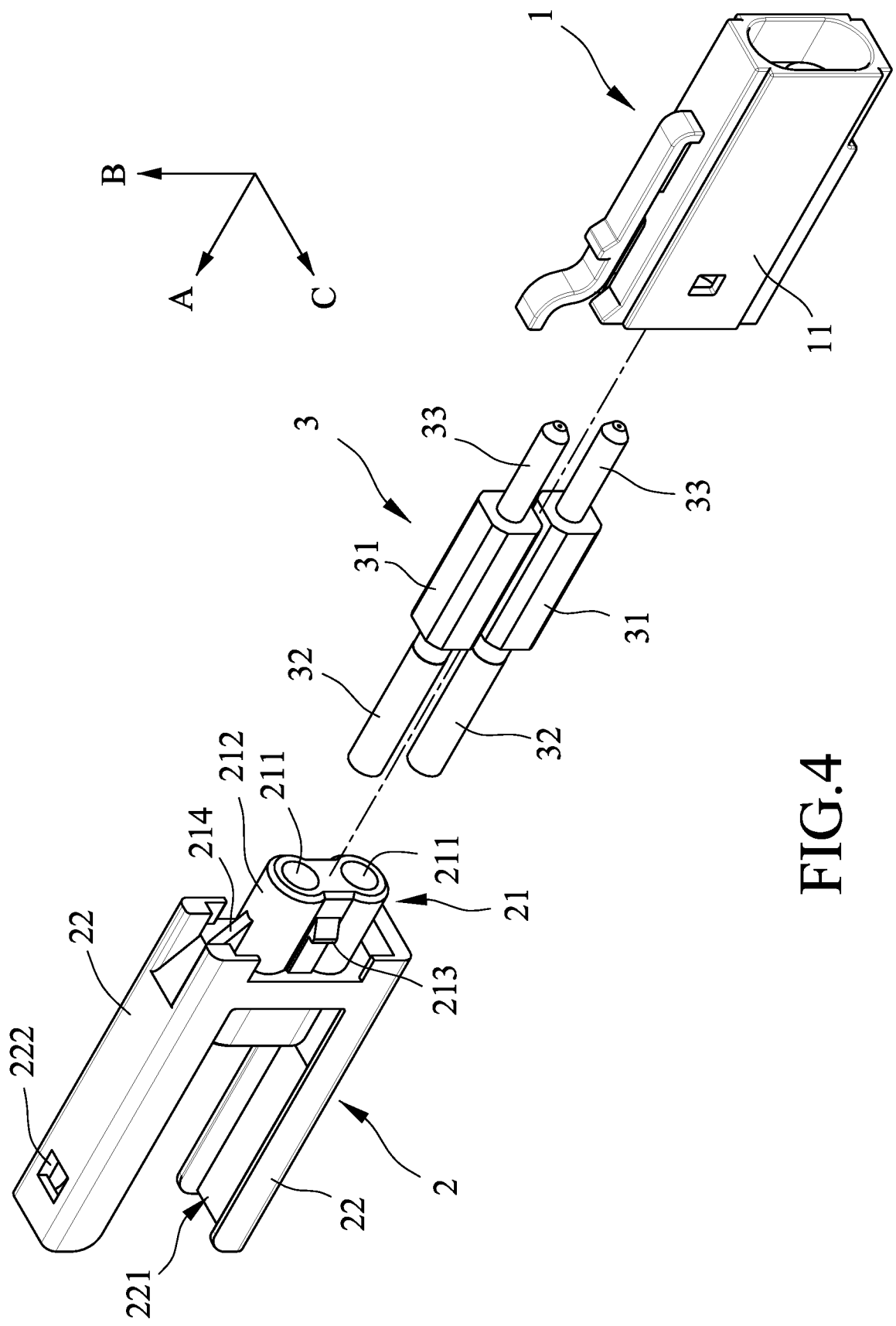
FIG. 4 is an exploded perspective view taken from another angle different from FIG. 2.

Referring to FIGS. 2, 3 and 4, the adapter unit 2 includes an insertion seat 21 connected removably to the main housing 11, and two guide frame bodies 22 connected respectively to two opposite ends of the insertion seat 21 in the transverse direction (B). The insertion seat 21 includes a seat portion 212 formed with two insertion holes 211, two engaging teeth 213 protruding laterally and respectively from two opposite sides of the seat portion 212 and respectively engaging the engaging open grooves 111, and a positioning protrusion 214 protruding from the seat portion 212 om the transverse direction (B) and inserted into the positioning groove 112. The insertion holes 211 are spaced apart from each other in the transverse direction (B), and extend in the front-rear direction (A). Each of the guide frame bodies 22 extends in the front-rear direction (A) away from the connecting unit 1, and has a guide groove 221 extending in the front-rear direction (A). The guide grooves 221 of the guide frame bodies 22 face each other. One of the guide frame bodies 22 further has a through hole 222 extending therethrough in the transverse direction (B), and is in spatial communication with the guide groove 221 of the guide frame body 220. The attenuation unit 3 includes two attenuation components 31 spaced apart from each other in the transverse direction (B) and disposed within the main housing 11, two rear ferrules 32 respectively connected to rear ends of the attenuation components 31 and respectively extending rearwardly into the insertion holes 211, and two front ferrules 33 respectively connected to front ends of the attenuation components 31, and respectively extending forwardly through and outwardly of the main housing 11. Different attenuation components 31 with different attenuation values may be selected by the user on demand, thereby achieving an adjustable design whereby the function of desired light attenuation is achieved.

The first embodiment may be connected, via the engaging portion 122 of the connecting member 12, to adapters of other different specifications, and may be inserted through the adapter unit 2 by connectors of other different specifications. At the same time, since the attenuation unit 3 can set the required attenuation value by selecting the corresponding specification to impart the optical fiber connector the required light attenuation function, connection to a stand-alone attenuator is no longer needed, so the number of components required can be minimized, and thus integration can be significantly increased and occupied space can be lowered, which is advantageous for responding to the needs of a densely disposed optical fiber circuit environment. Furthermore, the attenuation components 31 are designed to branch from one optical fiber to two ferrules, and thus are applicable to new optical fiber connection specifications, thereby increasing the universality and competitiveness of the product.

Figure 5:
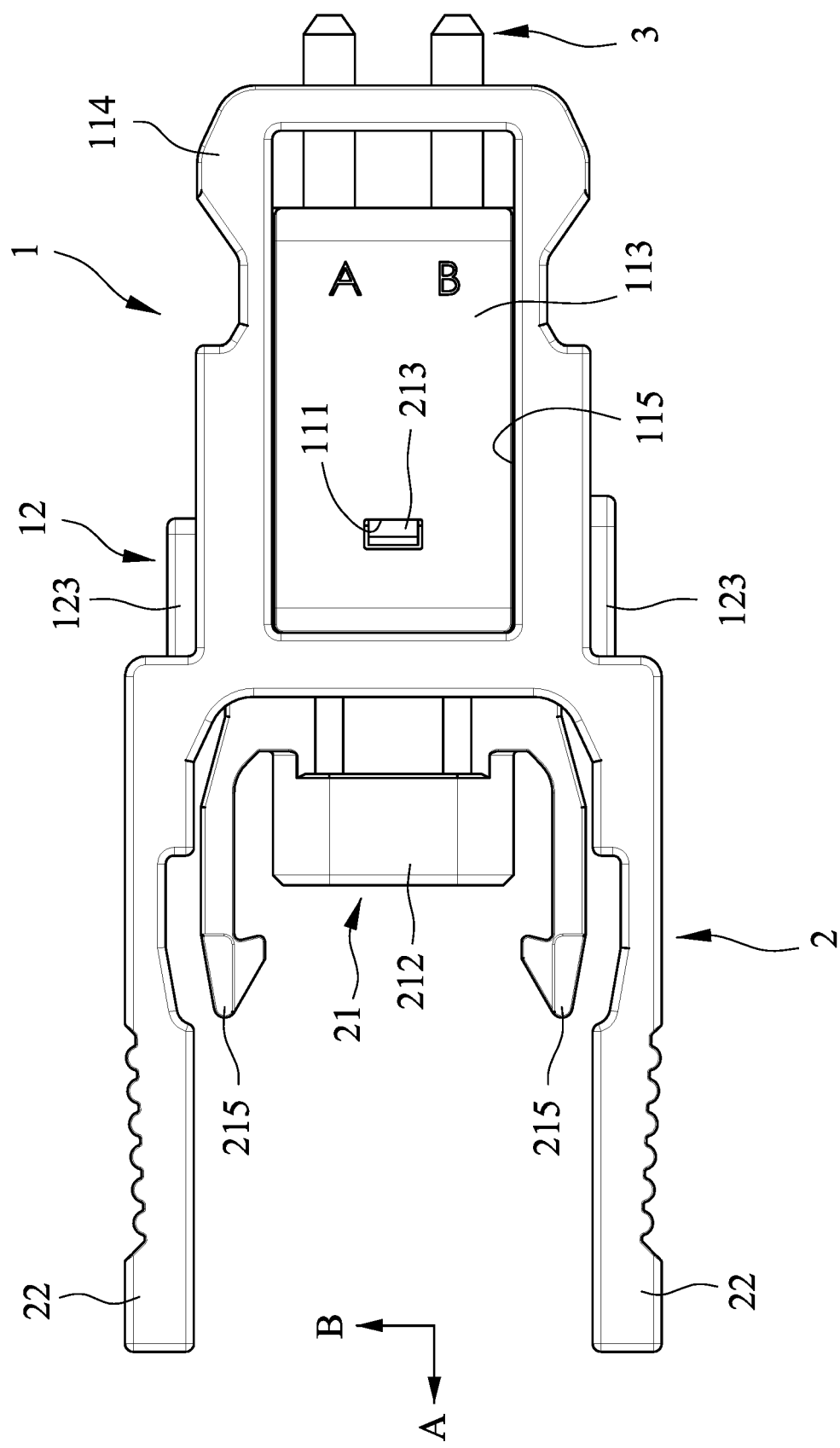
FIG. 5 is a side view illustrating a second embodiment of the optical fiber connector with attenuation function according to the present disclosure.
Figure 6:
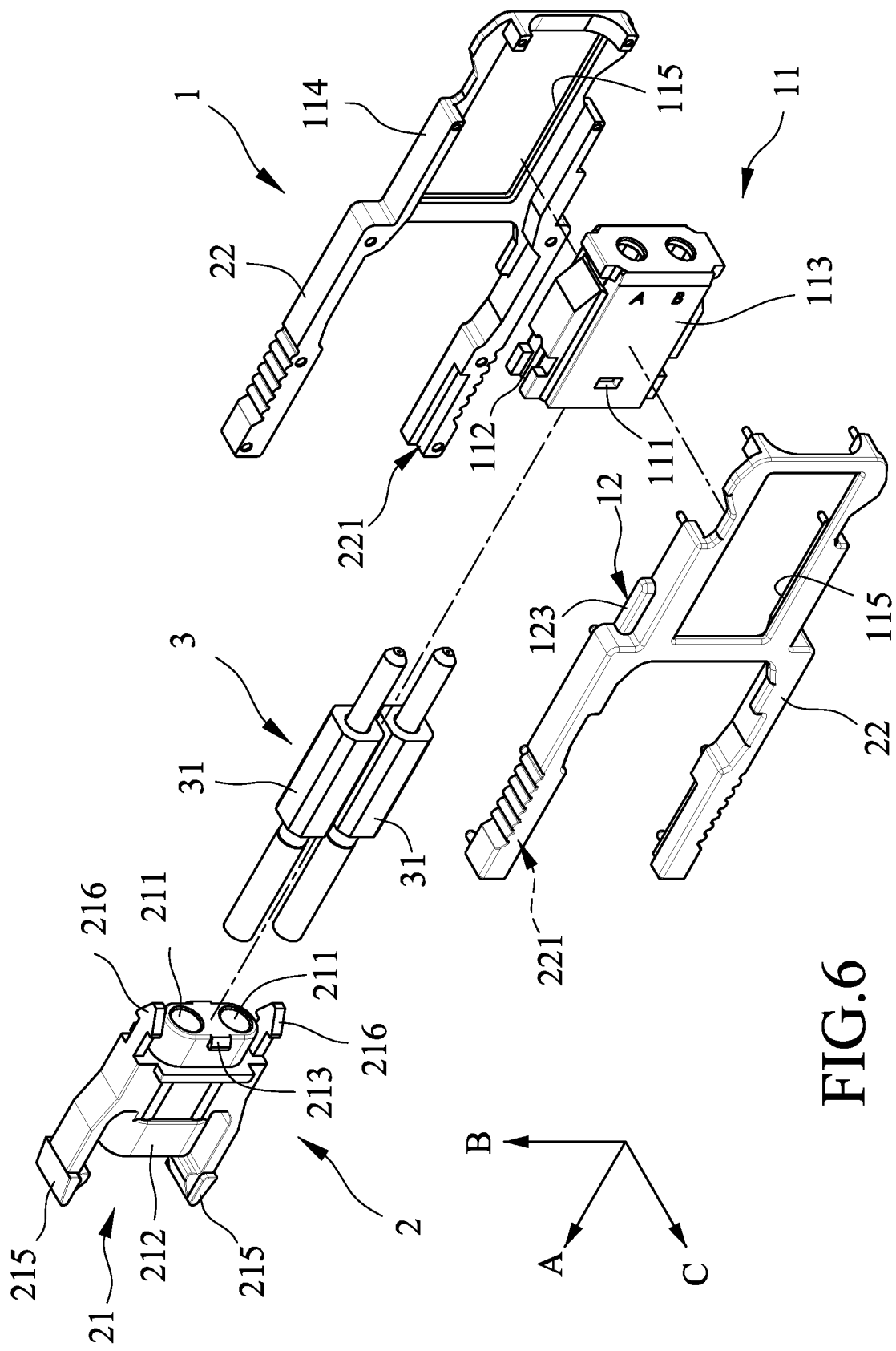
FIG. 6 is an exploded perspective view illustrating relative relationships between various parts of the second embodiment.
Figure 7:
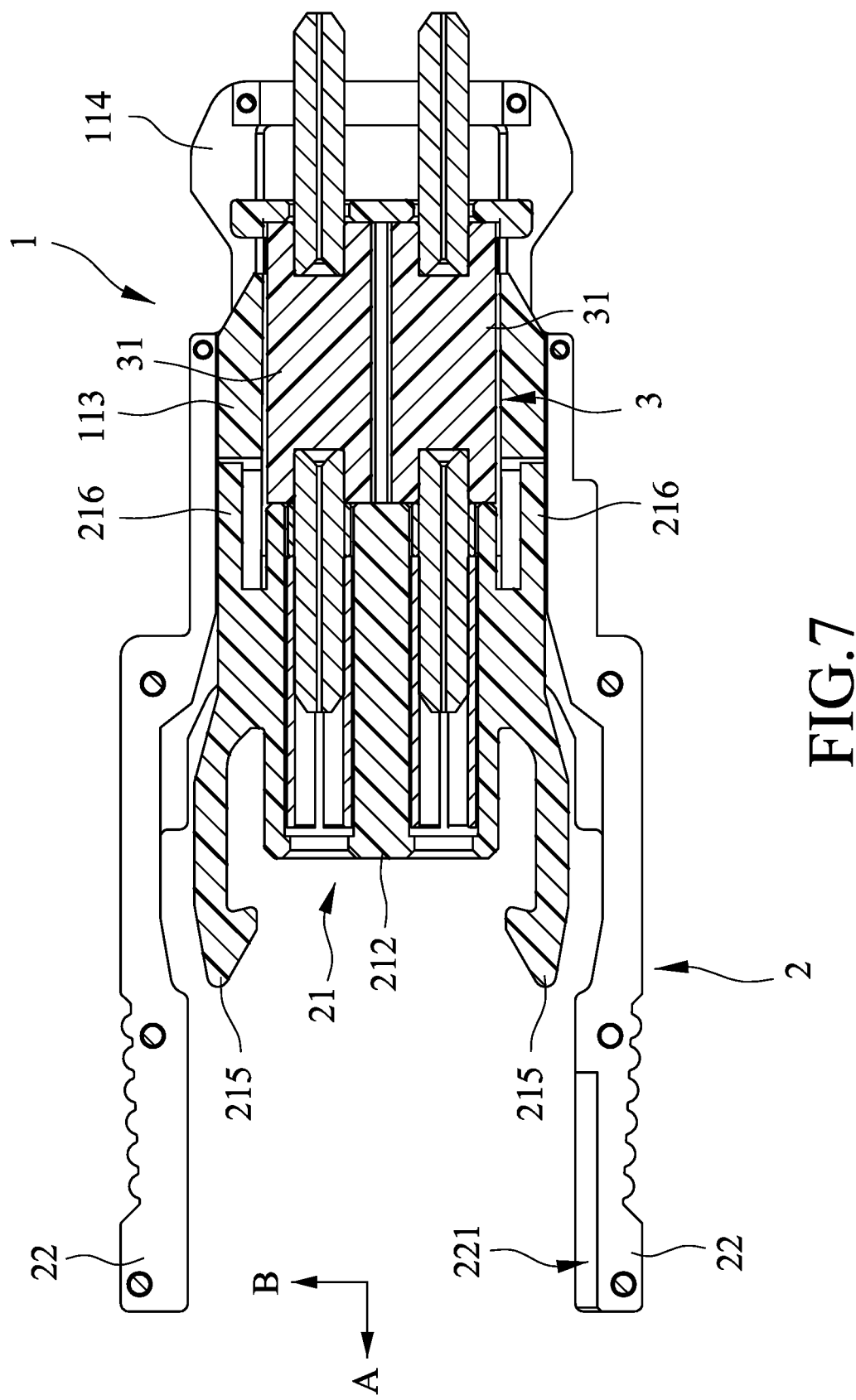
FIG. 7 is a sectional view of the second embodiment.

Referring to FIGS. 5, 6, and 7, a second embodiment of the optical fiber connector with attenuation function according to the present disclosure is illustrated, and the second embodiment is generally similar to the first embodiment, except for the configuration of the connecting unit 1 and the adapter unit 2. In this embodiment, the main housing 11 of the connecting unit 1 includes a shell core 113 formed with the engaging open grooves 111 and the positioning groove 112 and receiving the attenuation components 31, and an outer frame portion 114 surrounding the shell core 113 and for limiting the shell core 113. The outer frame portion 114 has two slots 115 located respectively at opposite sides of the shell core 113 in the lateral direction (C) and exposing the shell core 113. The connecting member 12 has two positioning blocks 123 spaced apart in the transverse direction (B) and respectively protruding upwardly and downwardly from two opposite sides of the outer frame portion 114. Each positioning block 123 is elongated in the front-rear direction (A). The extension portion 121 and the engaging portion 122 illustrated in the previous embodiment are not included in this embodiment. The positioning blocks 123 may correspond to and be connected to other adapters of different specifications. The insertion seat 21 further includes two engaging portions 215 extending from the seat portion 212 in the front-rear direction (A) and in the same direction to the guide frame bodies 22, and two connecting protrusions 216 extending forwardly from the seat portion 212 in opposite direction to the guide frame bodies 22. The hook-engaging portions 215 are located between the guide frame bodies 22 in the transverse direction (B), and the engaging teeth 216 are engaged with the positioning groove 112 of the shell core 113. The positioning protrusion 214 illustrated in the previous embodiment is not included in this embodiment.

In the second embodiment, the guide frame bodies 22 are integrally connected to the outer frame portion 114, and the integral of the guide frame bodies 22 and the outer frame portion 114 are divided into left and right parts, and thus the shell core 113 is constrained after the left and right parts are assembled together. Further, the guide frame bodies 22 are not formed with the through hole 222 as illustrated in the previous embodiment. The second embodiment provides an alternative form of the connector for the user to effectively improve universality according to requirements.

In summary, the optical fiber connector of the present disclosure can directly connect with other optical fiber connectors and optical fiber adapters and also has an adjustable light attenuation function without additional insertion into an external optical attenuator, so that the number of components required can be minimized, and thus greatly enhancing integration and reducing the occupied space, which is advantageous for responding to the needs of a densely disposed optical fiber circuit environment. Furthermore, the attenuation components 31 of this disclosure are designed to branch from one optical fiber to two ferrules, and thus are applicable to new optical fiber connection specifications, such that the purpose of this disclosure can be certainly achieved.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is(are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. An optical fiber connector with attenuation function comprising:
    a connecting unit including a main housing and a connecting member that is disposed on said main housing, said main housing and said connecting member being arranged in a transverse direction;
    an adapter unit including an insertion seat that is connected removably to said main housing, and two guide frame bodies that are located respectively at two opposite sides of said insertion seat in said transverse direction, said insertion seat having two insertion holes that are spaced apart from each other in said transverse direction and that extend in a front-rear direction perpendicular to said transverse direction, each of said guide frame bodies extending in said front-rear direction away from said connecting unit and having a guide groove that extends in said front-rear direction, said guide grooves of said guide frame bodies facing each other; and
    an attenuation unit including two attenuation components that are arranged in said transverse direction and that are disposed within said main housing, two rear ferrules that are respectively connected to rear ends of said attenuation components, and that respectively extend rearwardly into said insertion holes, and two front ferrules that respectively connected to front ends of said attenuation components, and that respectively extend forwardly through and outwardly of said main housing;
    wherein said main housing of said connecting unit has two engaging open grooves that are formed respectively in opposite sides thereof in a lateral direction perpendicular to said transverse direction and said front-rear direction; and
    wherein said insertion seat of said adapter unit includes a seat portion formed with said insertion holes, and two engaging teeth protruding laterally and respectively from opposite sides of said seat portion and respectively engaging said engaging open grooves.

2. The optical fiber connector with attenuation function as claimed in claim 1, wherein said connecting member of said connecting unit has an extension portion connected to said main housing and extending in said front-rear direction toward said adapter unit, and an engaging portion protruding from said extension portion in said transverse direction.

3. The optical fiber connector with attenuation function as claimed in claim 1, wherein:
    said main housing further has a positioning groove extending in said front-rear direction and opening toward said adapter unit; and
    said insertion seat of said adapter unit further includes a positioning protrusion protruding from said seat portion in said transverse direction and inserted into said positioning groove.

4. The optical fiber connector with attenuation function as claimed in claim 1, wherein said connecting member of said connecting unit has two positioning blocks spaced apart in said transverse direction and respectively protruding upwardly and downwardly from two opposite sides of said main housing, each positioning blocks being elongated in said front-rear direction.

5. The optical fiber connector with attenuation function as claimed in claim 4, wherein said main housing of said connecting unit includes a shell core formed with said engaging open grooves and receiving said attenuation components, and an outer frame portion surrounding and limiting said shell core, said positioning blocks extending from said outer frame portion, said guide frame bodies of said adapter unit being integrally connected to said outer frame portion.

6. The optical fiber connector with attenuation function as claimed in claim 5, wherein said insertion seat of said adapter unit further includes two hook-engaging portions extending from said seat portion in said front-rear direction, said hook-engaging portions being disposed between said guide frame bodies in said transverse direction.

7. The optical fiber connector with attenuation function as claimed in claim 6, wherein said insertion seat of said adapter unit further includes two connecting protrusions extending forwardly from said seat portion in opposite direction to said guide frame bodies, said connecting protrusions engaging said shell core.

8. The optical fiber connector with attenuation function as claimed in claim 5, wherein said outer frame portion of said main housing of said connecting unit has two slots located respectively at opposite sides of said shell core in said lateral direction, and exposing said shell core.

9. The optical fiber connector with attenuation function as claimed in claim 1, wherein said guide frame bodies of said adapter unit are respectively connected to opposite ends of said insertion seat in said transverse direction, one of said guide frame bodies further having a through hole extending therethrough in said transverse direction and being in spatial communication with said guide groove of said guide frame body.

* * * * *